(12) United States Patent
Yaguchi

(10) Patent No.: US 12,331,794 B2
(45) Date of Patent: Jun. 17, 2025

(54) AXIALLY DRIVING ACTUATOR

(71) Applicant: GKN Automotive Limited, Birmingham (GB)

(72) Inventor: Yuu Yaguchi, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/489,065

(22) Filed: Oct. 18, 2023

(65) Prior Publication Data

US 2024/0068528 A1 Feb. 29, 2024

Related U.S. Application Data

(63) Continuation of application No. PCT/JP2021/016449, filed on Apr. 23, 2021.

(51) Int. Cl.
| F16D 27/118 | (2006.01) |
| F16D 27/00 | (2006.01) |
| F16D 27/14 | (2006.01) |
| F16H 48/24 | (2006.01) |
| F16H 48/34 | (2012.01) |

(52) U.S. Cl.
CPC ............ *F16D 27/118* (2013.01); *F16D 27/14* (2013.01); *F16D 2027/005* (2013.01); *F16D 2300/18* (2013.01); *F16H 48/24* (2013.01); *F16H 2048/346* (2013.01)

(58) Field of Classification Search
CPC ......... F16D 2027/005; F16D 2027/007; F16D 27/118; F16D 27/14; F16H 48/24; F16H 2048/346
See application file for complete search history.

(56) References Cited

U.S. PATENT DOCUMENTS

| 2,021,534 A * | 11/1935 | Worgan ................... F16D 27/08 192/84.8 |
| 6,668,996 B2 * | 12/2003 | Nekado ................. F16D 27/115 192/84.91 |
| 7,002,444 B2 * | 2/2006 | Iwazaki .................... H01F 5/06 335/251 |
| 7,357,749 B2 * | 4/2008 | Nofzinger ............... F16H 48/08 475/157 |

(Continued)

FOREIGN PATENT DOCUMENTS

| JP | 2004116730 A | 4/2004 |
| JP | 2004208460 A | 7/2004 |

(Continued)

OTHER PUBLICATIONS

International Search Report and Written Opinion for PCT/JP2021/016449 mailed May 25, 2021 (8 pages; with English translation).

*Primary Examiner* — James J Taylor, II
(74) *Attorney, Agent, or Firm* — Reising Ethington P.C.

(57) ABSTRACT

An actuator for externally manipulating a clutch within a machine rotatable about an axis is provided with a driving unit including a plurality of magnetic coils arranged around the axis, each of the coils being arranged to generate a magnetic flux in a direction parallel to the axis; an armature disposed coaxially with the axis and opposed axially to the driving unit, the armature being movable axially; and a plunger coupled with the armature to transmit axial motion to the clutch.

9 Claims, 5 Drawing Sheets

(56) References Cited

U.S. PATENT DOCUMENTS

| | | | | |
|---|---|---|---|---|
| 7,913,827 | B2* | 3/2011 | Niikawa | F16D 48/064 |
| | | | | 192/84.91 |
| 10,323,699 | B2* | 6/2019 | Beesley | F16D 11/14 |
| 10,323,738 | B2 | 6/2019 | Komatsu | |
| 11,396,935 | B2* | 7/2022 | Allen | F16H 48/34 |
| 11,608,881 | B2* | 3/2023 | Yu | F16H 48/24 |
| 11,686,380 | B2* | 6/2023 | Cao | F16H 48/40 |
| | | | | 475/160 |
| 11,879,505 | B2* | 1/2024 | Yu | F16D 27/09 |
| 2008/0146353 | A1* | 6/2008 | Boffelli | H02K 49/108 |
| | | | | 464/29 |
| 2023/0417310 | A1* | 12/2023 | Verhoog | F16D 11/14 |

FOREIGN PATENT DOCUMENTS

| | | | |
|---|---|---|---|
| JP | 2015219944 | A | 12/2015 |
| JP | 2018009599 | A | 1/2018 |
| WO | 2018109874 | A1 | 6/2018 |

* cited by examiner

AXIALLY DRIVING ACTUATOR

CROSS-REFERENCE TO RELATED APPLICATIONS

This application is a continuation application of PCT Application No. PCT/JP2021/016449 (filed Apr. 23, 2021), the entire contents of which are incorporated herein by reference.

BACKGROUND

Rotary machines applied to vehicles often use clutches in order to selectively turn on and off (i.e., activate/deactivate, engage/disengage, etc.) their functions. A so-called lock-up differential, for example, has a built-in dog clutch that is typically disconnected to enable differential motion between output axles and that, when connected by an external actuator, locks up the differential motion. The actuator could include a hydraulic cylinder, a cam mechanism using a motor, a solenoid actuator, or some such.

Even when the actuator is brought into operation, the clutch may fail to become connected in certain rare cases such where clutch teeth happen to be at inappropriate positions for mutual engagement. Further, even when the actuator is operated in a reverse direction, temporary adhesion between the clutch teeth caused by viscosity of lubricant oil or magnetization might delay disengagement thereof. More specifically, switching the actuator on and off does not necessarily correspond to connection and disconnection of the clutch. To prevent unpredictable movements, any devices for detecting whether the clutch is connected or not may be additionally required. The following documents disclose related arts.

Japanese Patent Application Laid-open No. 2015-219944
PCT International Publication WO 2018/109874 A1
Japanese Patent Application Laid-open No. 2004-208460

SUMMARY

The present disclosure relates to an actuator for externally driving a clutch axially within a rotary machine such as a differential, including an actuator capable of accommodating built-in devices such as sensors without increase in size.

Detection devices cannot be added to an actuator unless the exterior of the actuator provides a considerable free space. Further in a case where the detection device is to be fixed to a carrier for the rotary machine, there is a problem as to how the detection device should be accurately placed relative to the rotary machine.

According to an aspect, an actuator for externally manipulating a clutch within a machine rotatable about an axis is provided with: a driving unit including a plurality of magnetic coils arranged around the axis, each of the coils being arranged to generate a magnetic flux in a direction parallel to the axis; an armature disposed coaxially with the axis and opposed axially to the driving unit, the armature being movable axially; and a plunger coupled with the armature to transmit axial motion to the clutch.

DESCRIPTION

Exemplary embodiments will be described hereinafter with reference to the appended drawings. Throughout the following descriptions and appended claims, unless otherwise described, an axis means a central axis of a clutch, which is typically consistent with a rotation axis of a rotary machine. Drawings are not necessarily to scale and therefore it is noted that dimensional relations are not limited to those drawn therein.

Figure 1:
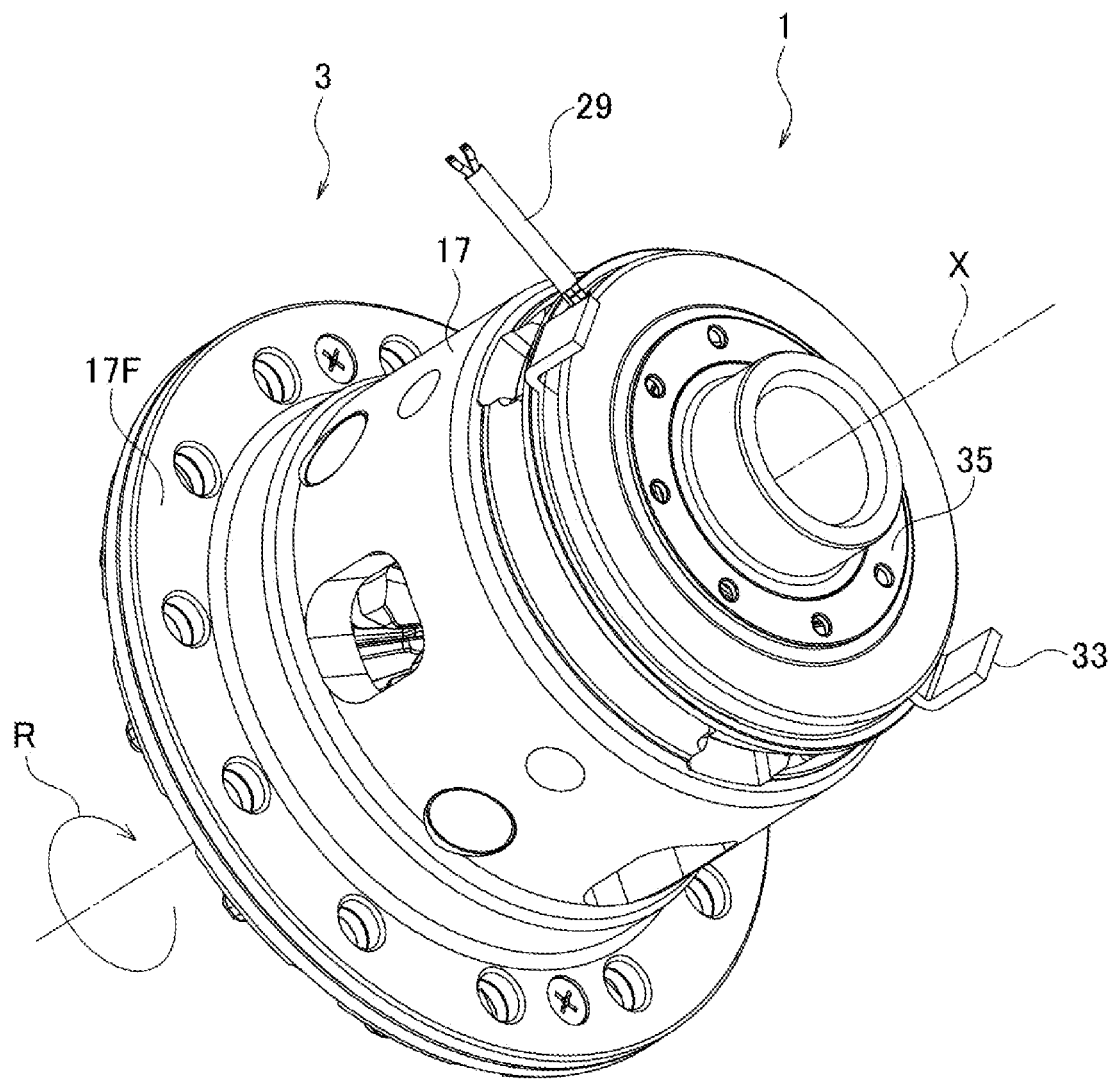
FIG. 1 is a perspective view of a differential with an actuator.
Figure 2:
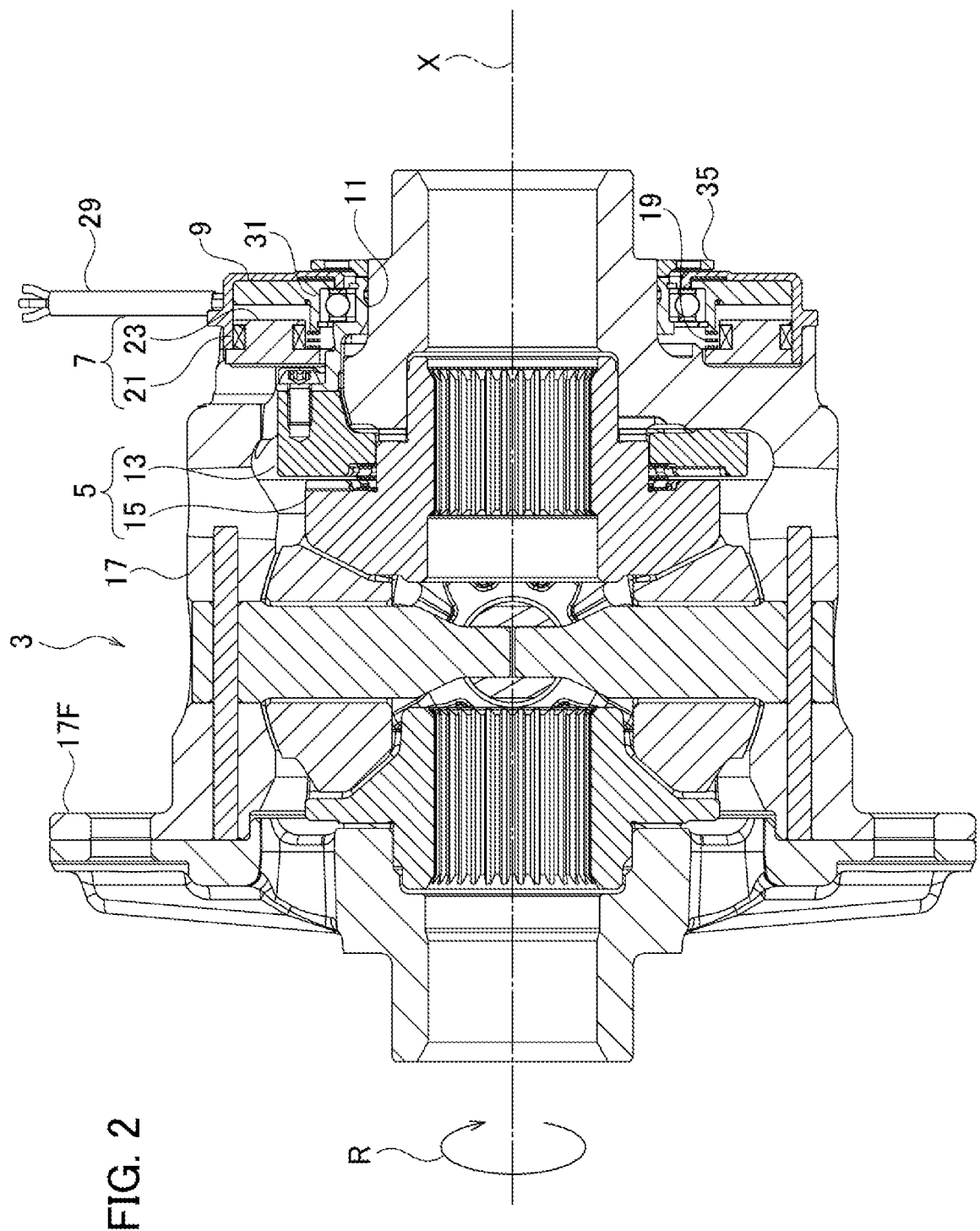
FIG. 2 is a sectional elevational view of the differential with the actuator.

Referring mainly to FIGS. 1, 2, an actuator 1 according to the present embodiment is used in combination with a rotary machine about an axis X, such as a differential 3, for example, to externally manipulate a clutch 5 within the machine. The applicability of the combination is not limited to the differential; the device may be combined with any rotary machine serving for power transmission in a vehicle, non-limiting examples of which are a transmission, a power transfer unit (PTU), and a coupling device. The clutch 5 may be a so-called dog clutch with dog teeth, for example, but any clutch of a type having a mutually engageable structure for transmitting torque, such as a claw clutch or such, or any friction clutch may be used.

The actuator 1 is generally provided with a driving unit 7, an armature 9 axially movable and attracted by the driving unit 7, a plunger 11 for transmitting axial motion of the armature 9, and a clutch member 13 driven by the plunger 11. The clutch member 13 is in this example so structured and arranged as to engage with a side gear 15, and the combination of the clutch member 13 and the side gear 15 constitutes the clutch 5. Of course, any other suitable element may be substituted for the side gear 15 to constitute the clutch 5.

The differential 3 is provided with a casing 17 having a flange 17F on its outer periphery, for example, and can receive torque via a ring gear fixed to the flange 17F to rotate about the axis X. The differential 3 is further provided with a differential gear set within the casing 17, and this gear set can differentially output the received torque to a pair of side gears. When the clutch 5 becomes disconnected, the differential motion between the side gears is allowed, although the differential motion is locked when the clutch is connected. In the example shown in the drawings, the clutch 5 is steadily (or continuously) disconnected and, when electric power is applied to the actuator 1, the clutch 5 becomes connected. A converse construction is also possible, in which the clutch 5 becomes disconnected when the electric power is applied to the actuator 1. The latter construction may be readily embodied by reversing the driving unit 7 and the armature 9 in direction, for example. Further, yet another construction is possible, in which the driving unit 7 and the armature 9 are reversed and also the clutch 5 becomes connected when the electric power is applied to the actuator 1.

Figure 3:
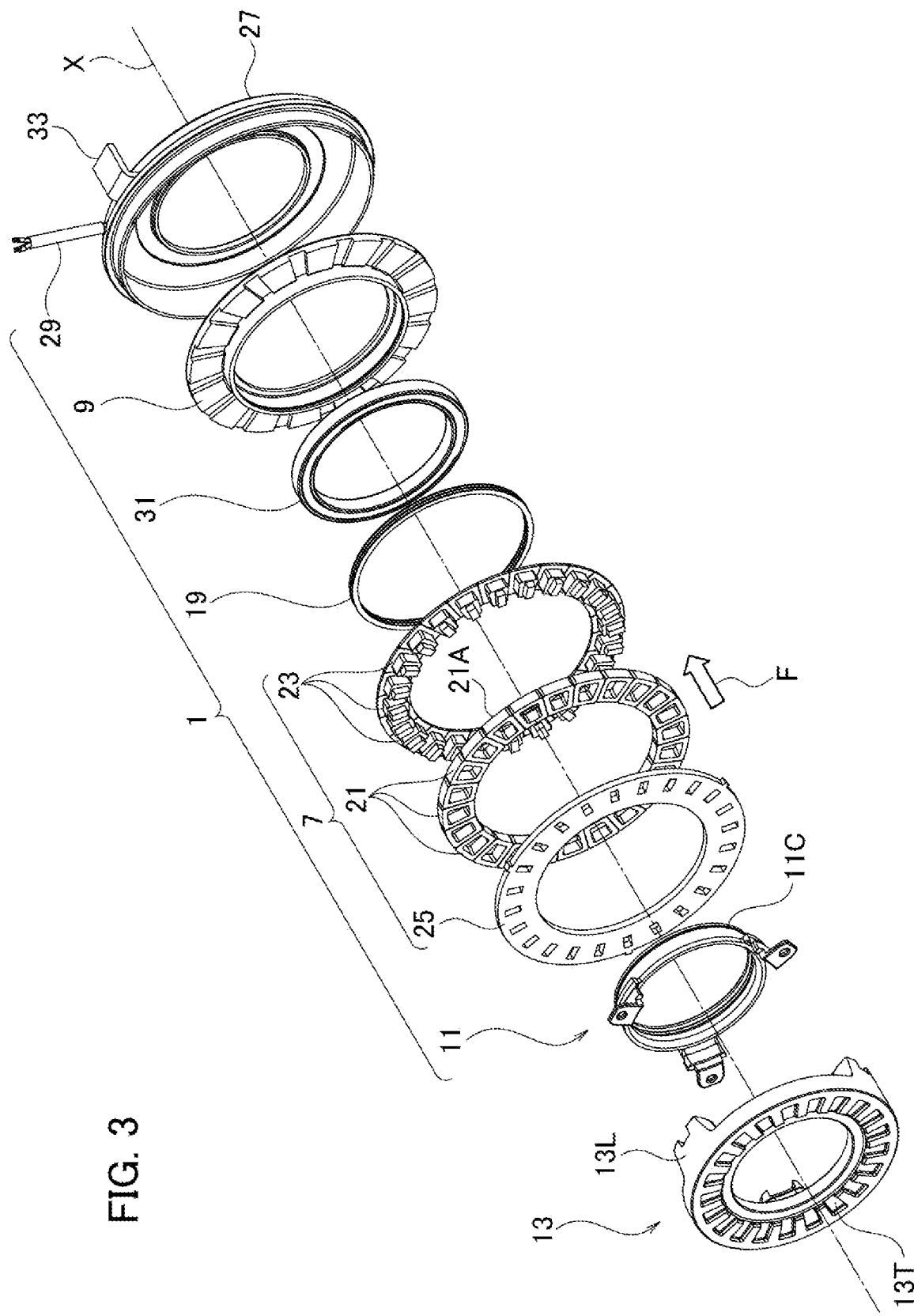
FIG. 3 is an exploded perspective view of the actuator with a clutch member.

Referring to FIG. 3 in combination with FIGS. 1, 2, the clutch member 13 and the plunger 11 coupled therewith are rotatable about the axis X along with the differential 3, whereas elements other than these in the actuator 1, particularly the driving unit 7 and the armature 9, are anti-rotated (i.e., prevented from rotation) about the axis X. While any suitable means may be used for the anti-rotation, in the example shown in the drawing, a housing 27 for housing the driving unit 7 is provided with a tab 33 and the tab 33 becomes engaged with an immovable element for preventing rotation.

The driving unit 7 is provided with a plurality of magnetic coils 21 arranged around the axis X. Each magnetic coil 21 is arranged to generate magnetic flux F in a direction parallel to the axis X. Although FIG. 3 illustrates that the magnetic coils 21 circumferentially adjoin together, they may be apart from each other. Any suitable number of coils may be used that is more than one. The overall arrangement may be asymmetrical but preferably the magnetic coils 21 are arranged symmetrical about the axis X. This is beneficial in preventing non-uniformity of generated driving force.

To effectively take out and guide the magnetic flux F, the driving unit 7 is further provided with a plurality of cores 23 respectively corresponding to the magnetic coils 21. The magnetic coils 21 and the cores 23 appear to be separate in FIG. 3 but the magnetic coils 21 may be respectively directly wound around the cores 23 to form unitized bodies. To support and fix the plurality of cores 23 to the housing 27, a circular plate 25 may be used. The plate 25 is provided with hollows or dents in which the cores 23 fit and is thereby coupled with the cores, or the cores 23 and the plate 25 may form a unitary body.

The actuator 1 can be provided with a housing 27 anti-rotated relative to the carrier. At least the magnetic coils 21 and the cores 23 can be housed in the housing 27, and, by covering and engaging the housing 27 with the plate 25, the whole of them is prevented from rotating. The housing 27 is further prevented from being displaced axially relative to a boss portion 17B of the casing 17 for example, and thereby the magnetic coils 21 and the cores 23 are axially immobilized. For preventing displacement, a ring 35 press-fit in the boss portion 17B may be used, for example and without limitation. Lead lines of the plurality of magnetic coils 21 are collected together to form a cable 29, which is led out of the housing 27.

The armature 9 is a member that is disk-shaped around the axis X and is totally or partly formed of a magnetic material. The armature 9 is disposed coaxially with the axis X and further opposed axially and close to the driving unit 7, in particular to its cores 23. The armature 9 can also be housed in the housing 27 and prevented from rotating about the axis X but movable axially. Nonetheless, the armature 9 may be rotatable and in this case may make rotational motions as well as axial motions. The armature 9 may have a structure for effectively receiving the magnetic flux F, e.g., block portions respectively corresponding to and projecting toward the cores 23. The block portions only may be formed of the magnetic material, and the other portions may be formed of non-magnetic materials.

As will be readily understood, when the magnetic coil 21 is excited by application of the electric power through the cable 29, the generated magnetic flux F causes the armature 9 to be attracted toward the driving unit 7 and move axially. To take the armature 9 back to its initial position when the electric power is cut off, a spring 19 may be interposed between the plate 25 and the armature 9. The spring 19 biases the armature 9 away from the driving unit 7.

Figure 5:
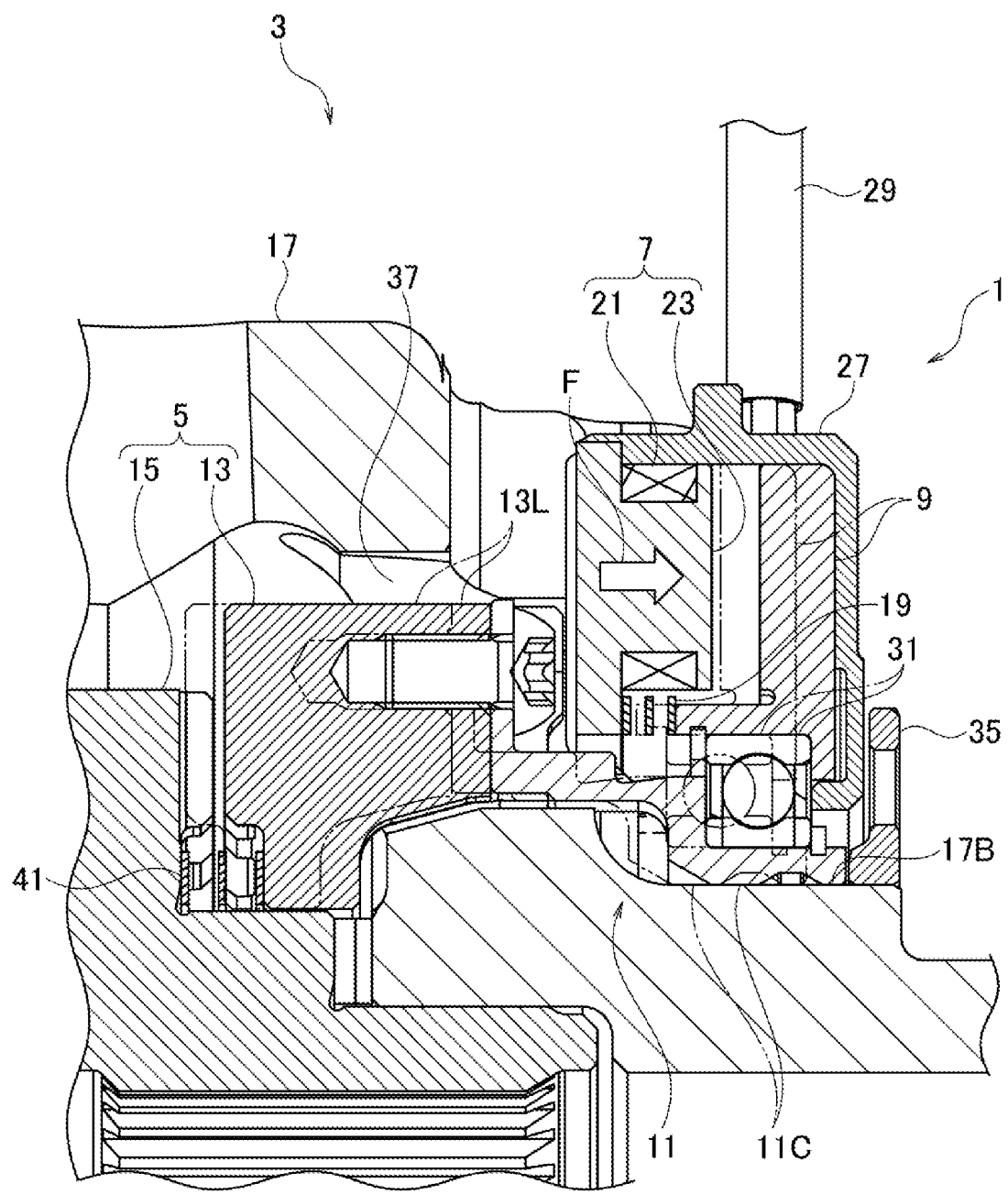
FIG. 5 is a sectional elevational view of the actuator and its peripheral members.

The plunger 11 intervenes between the armature 9 and the clutch member 13 to transmit axial motions of the armature 9 to the clutch member 13. Referring to FIG. 5 in combination with FIGS. 1 through 3, the plunger 11 is, on its inner periphery, provided with a short cylindrical portion 11C symmetrical about the axis X. This cylindrical portion 11C slidably fits on the boss portion 17B of the casing 17, whereby the plunger 11 is set in place relative to the casing 17 and is axially movable.

Between the armature 9 and the plunger 11, a bearing 31 may be interposed. The bearing 31 fits on the cylindrical portion 11C of the plunger 11 for example and is fixed thereto by means of a snap ring. Correspondingly the armature 9 may be provided with a short cylindrical portion at its internal periphery, and the bearing 31 fits in this cylindrical portion and is fixed thereto by means of a snap ring for example. Axial motion of the armature 9 is thereby bi-directionally transmitted to the plunger 11 and further the plunger 11 is rotatable relative to the armature 9.

The bearing 31 can be a thrust bearing, or any general ball bearing could be used because applied thrust force is not very great. Of course, any other bearing such as a roller bearing may be used.

Figure 4:
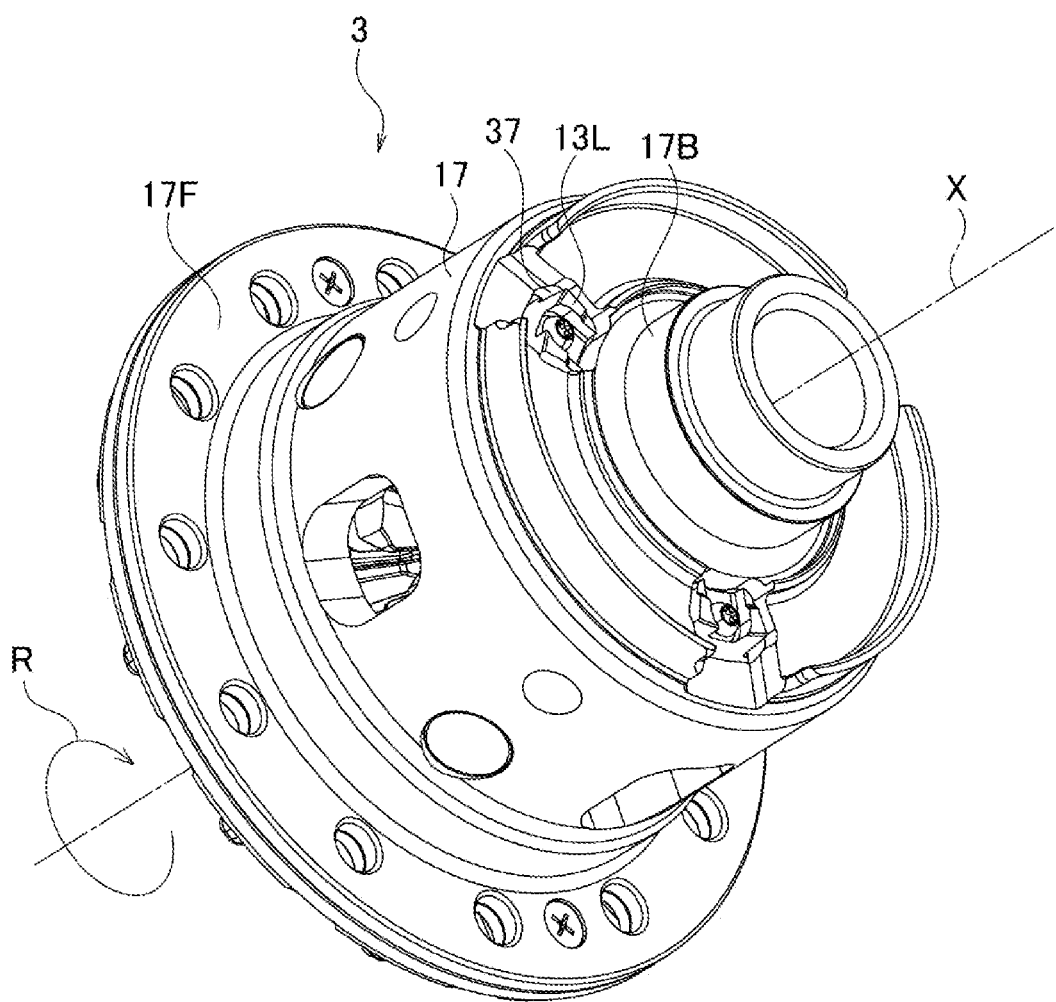
FIG. 4 is a perspective view of the differential in which the clutch member is incorporated.

Referring to FIG. 4 in combination with FIG. 3, in regard to the casing 17 of the differential 3, the plunger 11 is outside while the clutch member 13 is inside. The clutch member 13 is provided with dog teeth 13T on the inside face for example, which constitute the clutch 5. From its opposite face, one or more legs 13L respectively project axially outward. Corresponding to the legs 13L, the casing 17 is provided with through-holes 37 and the legs 13L are exposed through the through-holes 37 to the exterior. By means of the legs 13L, the plunger 11 and the clutch member 13 are coupled with each other, thereby axially moving together and rotating together about the axis X. Bolts may be used for the coupling, but of course any other suitable means may be used.

Referring mainly to FIG. 5 in combination with FIGS. 2, 3, when the magnetic coil 21 is excited by application of the electric power through the cable 29, the generated magnetic flux F causes the armature 9 to be attracted toward the driving unit 7 and the plunger 11 driven thereby moves the clutch 13 axially so as to set the clutch 5 connected. When the electric power is cut off so that the magnetic flux F vanishes, the plunger 11 is driven in the opposite direction mainly by the action of the spring 19 so that the clutch 5 becomes disconnected. To facilitate the disconnection, a spring 41 may be additionally interposed between the side gear 15 and the clutch member 13 for example, or the spring 41 may be substituted for the spring 19.

In the embodiments described so far, while the magnetic coil 21 is axially immovable, the armature 9 is movable and the armature 9 drives the plunger 11, instead the magnetic coil 21 may be rendered movable to drive the plunger 11. In the latter case, any suitable member coupled with the magnetic coil 21, corresponding to the core 23 or the plate 25 in the aforementioned embodiments, may be coupled with the plunger 11, or any intervening member independent of these members may couple the magnetic coil 21 with the plunger 11. These members can be referred to as "core" or "armature" for non-limiting descriptive purposes.

According to the present embodiments the actuator advantageously is free from a structure such as many turns of a lead line around the axis. As the magnetic coils 21 are independent of each other and are not necessarily in contact together in the circumferential direction, other elements may be disposed in respective gaps between the magnetic coils 21. Such an example is a proximity sensor. By using the proximity sensor to detect whether the armature 9 is apart or close, it is possible to determine whether the clutch 5 is connected or disconnected.

Alternatively, one or more magnetic coils 21A among the plurality of magnetic coils 21 may be used to detect the position of the armature 9. As electromotive force is developed in the magnetic coils 21A when the armature 9 becomes close to, or away therefrom, by detecting it, it is possible to determine whether the clutch 5 is connected or disconnected. For the purpose of such detection, another cable may be led out of the magnetic coils 21A independently of the rest of the magnetic coils 21.

Yet further alternatively, it is possible to detect a change in impedance of the magnetic coil 21A, which depends on the position of the armature 9. Further, in place of the magnetic coil 21A, a sensor such as a proximity sensor may be disposed, or a contact sensor or a mechanical switch may be instead disposed.

In any case, a member moving along with the clutch member 13, the armature 9 for example, is inside the actuator 1 and the device for detecting its position can be also housed in the actuator 1. Consequently the device for detecting whether the clutch 5 is connected or disconnected can be housed within the actuator 1 and therefore it is unnecessary to additionally provide any detection device at the outside. The present embodiments do not need any free space outside the actuator 1 and are therefore compact. It is further unnecessary to add the detection device on the carrier and further the positional relation between the carrier and the actuator 1 does not require particular accuracy. As the outline of the actuator 1 is compatible with conventional actuators, the device according to the present embodiments can be used compatibly with the prior devices.

Although certain exemplary embodiments are described above, modifications and variations of the embodiments will occur to those skilled in the art, and are within the scope of the present disclosure and claims, in light of the above teachings.

What is claimed is:

1. An actuator for externally manipulating a clutch within a differential rotatable about an axis, comprising:
    a driving unit including a plurality of magnetic coils arranged around the axis, each of the coils being arranged to generate a magnetic flux in a direction parallel to the axis;
    an armature disposed coaxially with the axis and opposed axially to the driving unit, the armature being movable axially and attracted toward the driving unit;
    a leg axially projecting from the clutch and passing through a through-hole of a casing of the differential with the leg exposed through the through-hole to an exterior of the casing; and
    a plunger coupled with the armature and the leg to transmit axial motion to the clutch, wherein the clutch includes a clutch member that has dog teeth and the leg is formed as part of a unitary body with the clutch member.

2. The actuator of claim 1, wherein the plunger includes a cylindrical portion symmetrical about the axis and the cylindrical portion slidably fits in the differential.

3. The actuator of claim 1, wherein a cable is led out of at least one of the magnetic coils independently of the rest of the magnetic coils.

4. The actuator of claim 1, further comprising:
    a spring biasing the armature away from the driving unit.

5. The actuator of claim 1, wherein the driving unit is prevented from rotating about the axis.

6. The actuator of claim 1, wherein the plunger is rotatably coupled with the armature to rotate along with the clutch about the axis.

7. The actuator of claim 1, further comprising:
    a sensor configured to detect whether the armature is apart or close, the sensor being disposed between any two of the magnetic coils or in place of any one of the magnetic coils.

8. An actuator for externally manipulating a clutch within a differential rotatable about an axis, comprising:
    a driving unit including a plurality of magnetic coils arranged around the axis, each of the coils being arranged to generate a magnetic flux in a direction parallel to the axis;
    an armature disposed coaxially with the axis and opposed axially to the driving unit, the armature being movable axially;
    a leg axially projecting from the clutch and passing through a through-hole of a casing of the differential with the leg exposed through the through-hole to an exterior of the casing; and
    a plunger coupled with the armature and the leg to transmit axial motion to the clutch, wherein the clutch includes a clutch member that has dog teeth and the leg is formed as part of a unitary body with the clutch member, wherein the plunger includes a cylindrical portion symmetrical about the axis and the cylindrical portion slidably fits in the differential.

9. An actuator for externally manipulating a clutch within a differential rotatable about an axis, comprising:
    a driving unit including a plurality of magnetic coils arranged around the axis, each of the coils being arranged to generate a magnetic flux in a direction parallel to the axis;
    an armature disposed coaxially with the axis and opposed axially to the driving unit, the armature being movable axially;
    a leg axially projecting from the clutch and passing through a through-hole of a casing of the differential with the leg exposed through the through-hole to an exterior of the casing;
    a plunger coupled with the armature and the leg to transmit axial motion to the clutch, wherein the clutch includes a clutch member that has dog teeth and the leg is formed as part of a unitary body with the clutch member; and
    a spring biasing the armature away from the driving unit.

* * * * *